United States Patent
Terai et al.

(10) Patent No.: US 8,561,353 B2
(45) Date of Patent: Oct. 22, 2013

(54) QUARTER WINDOW

(75) Inventors: Hideaki Terai, Kariya (JP); Yukio Matsuda, Okazaki (JP)

(73) Assignees: Kabushiki Kaisha Toyota Jidoshokki (JP); Toyota Jidosha Kabushiki Kaisha (JP)

( * ) Notice: Subject to any disclaimer, the term of this patent is extended or adjusted under 35 U.S.C. 154(b) by 792 days.

(21) Appl. No.: 12/596,620

(22) PCT Filed: Jul. 17, 2008

(86) PCT No.: PCT/JP2008/063327
§ 371 (c)(1),
(2), (4) Date: Oct. 19, 2009

(87) PCT Pub. No.: WO2009/011453
PCT Pub. Date: Jan. 22, 2009

(65) Prior Publication Data
US 2010/0156138 A1    Jun. 24, 2010

(30) Foreign Application Priority Data
Jul. 19, 2007 (JP) ................................. 2007-188310

(51) Int. Cl.
*E06B 3/54* (2006.01)
(52) U.S. Cl.
USPC .................................. 49/502; 49/440; 49/441
(58) Field of Classification Search
USPC ............................................ 49/440, 441, 502
See application file for complete search history.

(56) References Cited

U.S. PATENT DOCUMENTS

| | | | | |
|---|---|---|---|---|
| 4,625,459 A | * | 12/1986 | Warner | 49/489.1 |
| 4,800,681 A | * | 1/1989 | Skillen et al. | 49/440 |
| 5,076,638 A | * | 12/1991 | Andexlinger et al. | 296/201 |
| 5,139,307 A | * | 8/1992 | Koops et al. | 296/201 |
| 5,317,835 A | * | 6/1994 | Dupuy et al. | 49/441 |

(Continued)

FOREIGN PATENT DOCUMENTS

| | | |
|---|---|---|
| DE | 2847404 | 5/1980 |
| DE | 2847404 A1 | 5/1980 |
| DE | 10216237 | 10/2003 |
| GB | 2422398 | 7/2006 |
| JP | 04-303018 | 10/1992 |
| JP | 04303018 | 10/1992 |

(Continued)

OTHER PUBLICATIONS

"Notice of Reason for Rejection", Translation of portion of Japanese Office Action, mailing date: Jan. 4, 2012, 2 pages (relevance for foreign reference DE 2847404).

*Primary Examiner* — Gregory J. Strimbu
(74) *Attorney, Agent, or Firm* — Woodcock Washburn LLP

(57) ABSTRACT

A quarter window attached to a door frame of a vehicle rear door includes a quarter window panel and a window frame. The quarter window panel is made of a synthetic resin material. The window frame includes a division bar and a sealing portion. The division bar is configured such that a glass run can be fitted to the division bar and a part of the division bar serves as a part of the sealing portion. The sealing portion is integrally coupled to the quarter window panel so as to extend along the periphery of a side of the quarter window panel that faces inside of the vehicle. A part of the sealing portion is capable of being fitted to the door frame. The quarter window panel and the window frame are integrally molded. The window frame is made of a synthetic resin having a high rigidity. A fixing portion for fixing the window frame to the door frame is integrally formed with the window frame.

4 Claims, 3 Drawing Sheets

(56) References Cited

U.S. PATENT DOCUMENTS

| | | | |
|---|---|---|---|
| 5,702,148 A * | 12/1997 | Vaughan et al. | 296/146.9 |
| 6,299,235 B1 * | 10/2001 | Davis et al. | 296/146.16 |
| 6,571,513 B2 * | 6/2003 | Maass | 49/489.1 |
| 2005/0229496 A1 | 10/2005 | Tashima et al. | |
| 2005/0269741 A1 | 12/2005 | Rigby et al. | |
| 2006/0156632 A1 * | 7/2006 | Ruppert et al. | 49/502 |

FOREIGN PATENT DOCUMENTS

| | | |
|---|---|---|
| JP | 62-265018 | 11/1997 |
| JP | 2000-229518 | 8/2000 |
| JP | 2001-071752 | 3/2001 |
| JP | 2004-303018 | 10/2004 |
| JP | 2004-359220 | 12/2004 |
| JP | 2004359220 | 12/2004 |

* cited by examiner

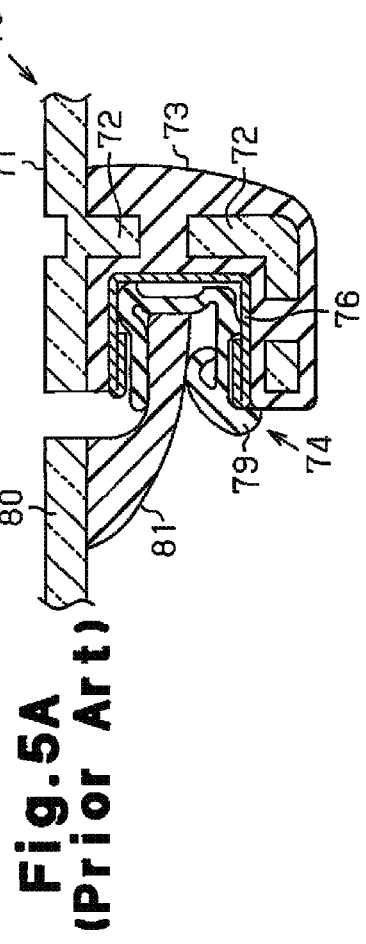
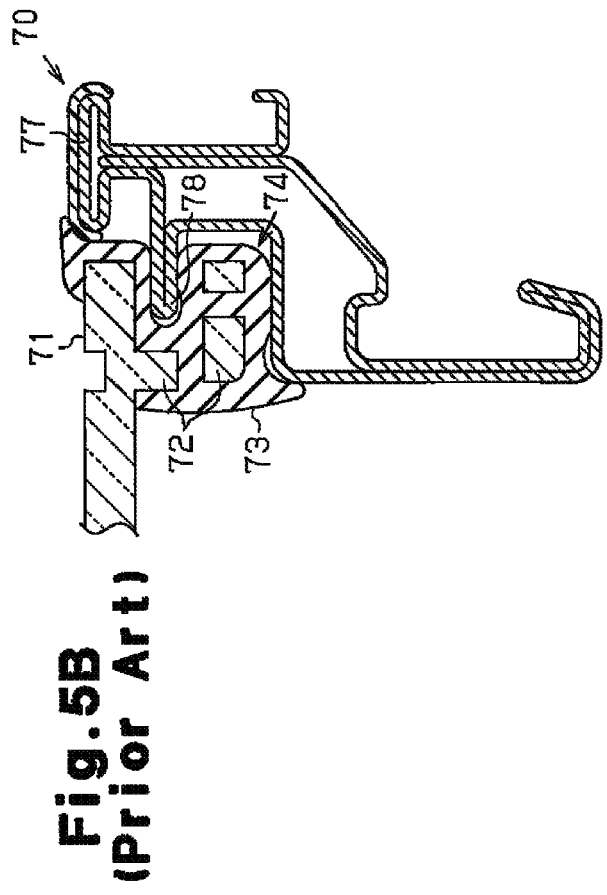
Fig.4
Fig.5A (Prior Art)
Fig.5B (Prior Art)

QUARTER WINDOW

FIELD OF THE INVENTION

The present invention relates to a quarter window provided in a vehicle rear door.

BACKGROUND OF THE INVENTION

A quarter window provided in an automobile rear door is disclosed, for example, in Japanese Laid-Open Patent Publication No. 62-265018. As shown in FIGS. 5A and 5B, a quarter window 70 disclosed in the publication has a window panel 71 made of a synthetic resin. The window panel 71 is shaped like a right triangle in a plan view, and includes an opposite side portion, a hypotenuse portion, and a base portion. On a side of the window panel 71 facing inside of the automobile, insert portions each extending along either the opposite side portion (FIG. 5A) or the hypotenuse portion (FIG. 5B) are provided. Each insert portion 72 forms a peripheral portion of the window panel 71, and a holding portion 74 that has a substantially channel-like cross section. The window panel 71 and the insert portions 72 are molded integrally through, for example, injection. A sealing member 73 is integrally coupled to the surface of the window panel facing inside of the automobile with the insert portions 72. The sealing member 73 extends along the entire periphery of the window panel 71. The holding portion 74 is covered by the sealing member 73. The sealing member 73 is formed of a polymer elastic material (rubber or thermoplastic elastomer).

When manufacturing the quarter window 70, the window panel 71 and a division bar 76 are placed in a mold (not shown), and a polymer elastic material is injected into a cavity defined in the mold and cured. As a result, the sealing member 73 is integrally molded with the insert portions 72.

As shown in FIG. 5B, a section of the holding portion 74 at the hypotenuse portion holds a frame flange 78 of the rear door 77. As shown in FIG. 5A, a section of the holding portion 74 at the opposite side portion holds a slider 81 of a rear door glass 80 with a glass run 79 fitted to the division bar 76. Accordingly, the quarter window 70 is installed in the rear door 77, and, as shown in FIG. 5B, the rear portions of the window panel 71 and the rear door 77 are substantially flush, which improves the appearance.

According to the configuration disclosed in the above publication, the holding portions 74 hold the frame flange 78 and the slider 81. The division bar 76 and the base portion of the window panel 71 are pressed into the rear door 77 so that the quarter window 70 is installed in the rear door 77. The inner surfaces of the holding portions 74 are coated with the sealing member 73 made of a polymer elastic material. Therefore, after the quarter window 70 is installed in the rear door 77, the quarter window 70 might come off the rear door 77 due to elastic deformation of the sealing member 73.

SUMMARY OF THE INVENTION

Accordingly, it is an objective of the present invention to provide a quarter window that has an improved appearance and is securely fixed to a rear door.

To achieve the foregoing objective and in accordance with one aspect of the present invention, a quarter window attached to a door frame of a vehicle rear door is provided. The quarter window includes a quarter window panel made of a synthetic resin material and a window frame including a division bar and a sealing portion. The division bar is configured such that a glass run can be fitted to the division bar. The sealing portion includes, as a part, the division bar. The sealing portion is integrally coupled to the quarter window panel so as to extend along the periphery of a side of the quarter window panel that faces inside of the vehicle. A part of the sealing portion is capable of being fitted to the door frame. The quarter window panel and the window frame are integrally molded. The window frame is made of a synthetic resin having a high rigidity. A fixing portion for fixing the window frame to the door frame is integrally formed with the window frame.

BRIEF DESCRIPTION OF THE DRAWINGS

FIG. 4 is a perspective view showing the quarter window of FIG. 1, as viewed from the inside of the automobile;
and
FIGS. 5A and 5B are cross-sectional views illustrating a quarter window described in BACKGROUND ART section.

DETAILED DESCRIPTION OF THE PREFERRED EMBODIMENTS

One embodiment of the present invention will now be described with reference to FIGS. 1 to 4.

Figure 1:
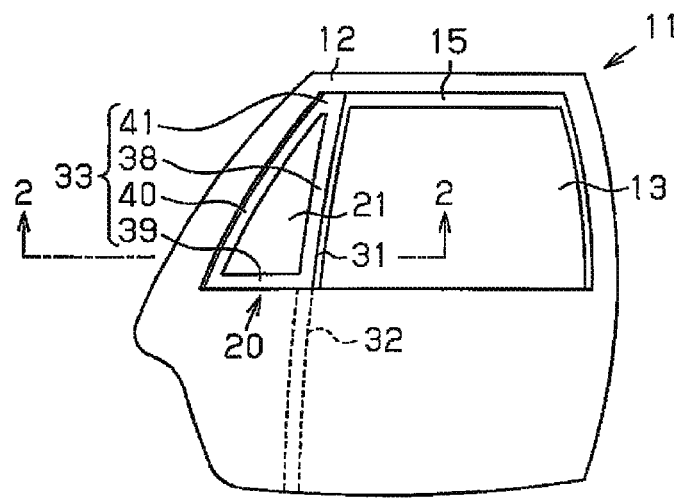
FIG. 1 is a perspective view schematically showing a rear door according to one embodiment of the present invention.
Figure 2:
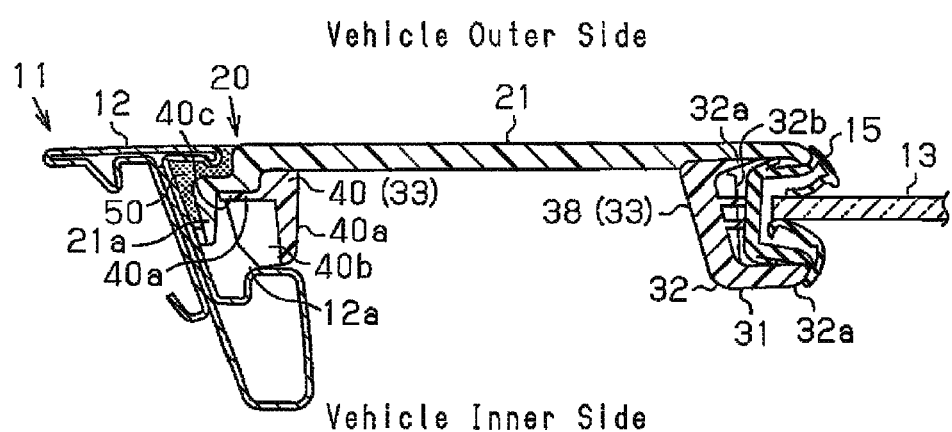
FIG. 2 is a cross-sectional view taken along line 2-2 of FIG. 1.

As shown in FIG. 1, a rear door 11 of an automobile, which is a vehicle, has a window panel 13 attached to a door frame 12, and a quarter window 20 fixed to the door frame 12. In FIG. 2, the lower side corresponds to the inside of the automobile, while the upper side corresponds the outside of the automobile.

Figure 3:
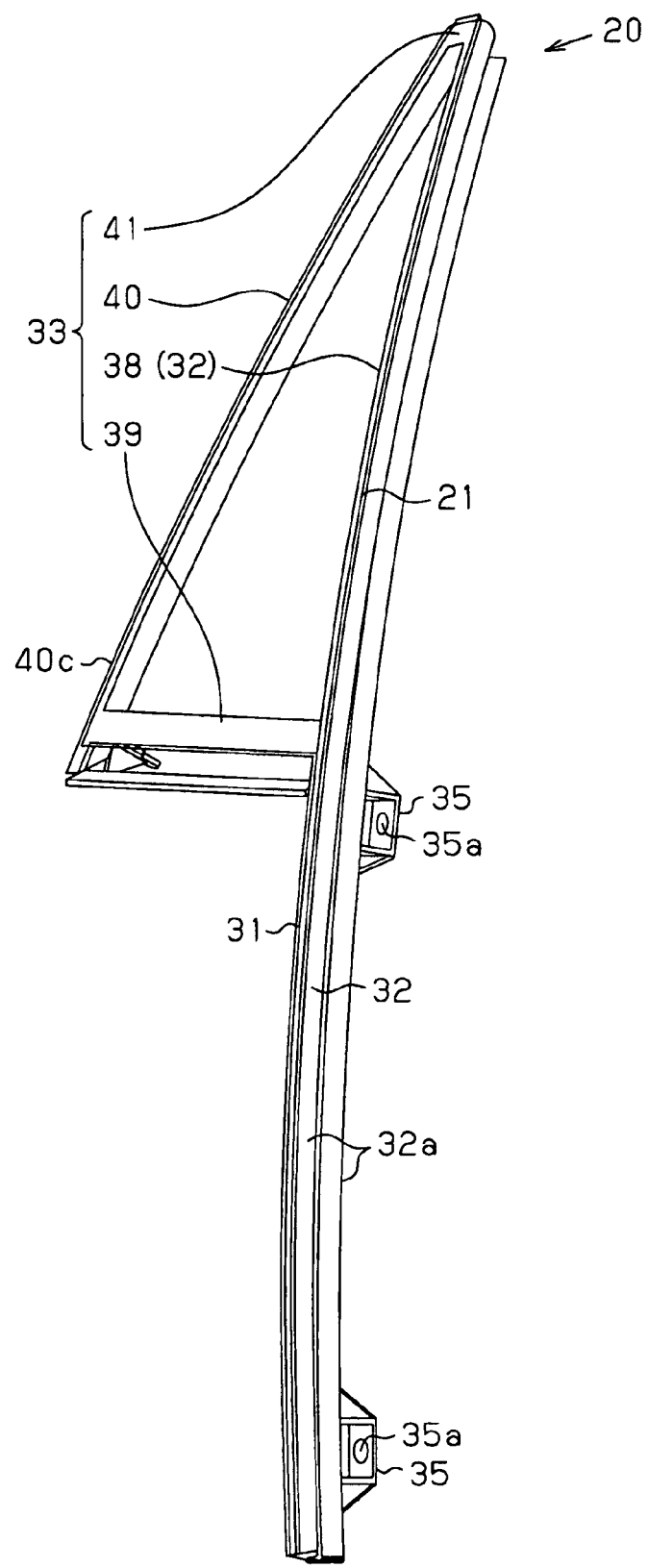
FIG. 3 is a perspective view showing the quarter window of FIG. 1, as viewed from the outside of the automobile.

The quarter window 20 will now be described in detail. As shown in FIGS. 2 and 3, the quarter window 20 includes a quarter window panel 21 and a window frame 31. The quarter window panel 21 is made of transparent polycarbonate, which is a synthetic resin. The window frame 31 is made of a material having a higher rigidity than that of the window panel 21. Specifically, the window frame 31 is made of a synthetic resin material having a high rigidity, or polycarbonate containing glass fiber (fiberglass reinforced plastic). The quarter window panel 21 and the window frame 31 are integrally molded by two-color molding. "Synthetic resin having a high rigidity" refers to an elastic synthetic resin having a rigidity higher than that of elastic resin material such as rubber and thermoplastic elastomer.

As shown in FIG. 3, the quarter window panel 21 includes a portion that is substantially shaped as a right triangle in a front view, and an elongated portion that extends downward along the opposite side of the right triangle portion. The window frame 31 includes a division bar portion 32, which extends vertically when the window frame 31 is fixed to the door frame 12. The window frame 31 has a sealing portion 33 that is integrally coupled to the quarter window panel 21 so as to extend along the entire periphery of the quarter window panel 21 facing inside of the automobile. Part of the sealing portion 33 is fitted to the door frame 12. That is, the window frame 31 is formed by integrating the division bar portion 32 and the sealing portion 33. The window frame 31 is colored in black.

As shown in FIG. 2, the division bar portion 32 has a substantially channel-like cross section along a plane perpendicular to the longitudinal direction of the division bar 32, and the channel-like shape opens to the front of the automobile. The division bar portion 32 has a pair of side walls 32a located on the side facing inside of the automobile and the side facing outside of the automobile, so as to be opposed to each other. A plurality of reinforcing ribs 32b extend between the side walls 32a. The reinforcing ribs 32b are arranged at intervals along the longitudinal direction of the division bar 32.

As shown in FIGS. 3 and 4, a plurality of fixing portions 35 for fixing the window frame 31 to the door frame 12 are integrally formed on the inner side wall 32a. The fixing portions 35 arranged along the longitudinal direction of the division bar 32 at an interval. A fixing hole 35a is formed in each fixing portion 35.

The sealing portion 33 will now be described. As shown in FIG. 3, the outline of the sealing portion 33 is shaped like a right triangle frame. The sealing portion 33 includes an opposite side portion 38, a base portion 39, hypotenuse portion 40, and a top portion 41. The opposite side portion 38 corresponds to the opposite side of a right triangle, and serves as an upper section of the division bar portion 32. The base portion 39 corresponds to the base of a right triangle, and extends from a longitudinal center of the division bar portion 32 in a direction perpendicular to the division bar portion 32. The hypotenuse portion 40 corresponds to the hypotenuse of the right triangle, and extends diagonally relative to the direction in which the base portion 39 extends. The top portion 41 connects the upper end of the opposite side portion 38 and the upper end of the hypotenuse portion 40.

As shown in FIG. 4, the base portion 39 has a substantially channel-like cross section along a plane perpendicular to the longitudinal direction of the base portion 39, and the channel-like shape opens to the inside of the automobile. As shown in FIG. 2, the hypotenuse portion 40 is shaped such that its cross section along a plane perpendicular to the longitudinal direction opens to the inside of the automobile. The hypotenuse portion 40 has a pair of side walls 40a that forms the opening. A plurality of reinforcing ribs 40b extend between the side walls 40a. The reinforcing ribs 40b are arranged at intervals along the longitudinal direction of the hypotenuse portion 40. As shown in FIG. 4, a fixing portion 42 for fixing the window frame 31 to the door frame 12 extends into the automobile from the top portion 41. A threaded hole (not shown) is formed in the fixing portion 42. A screw (not shown) attached to the door frame 12 is threaded to the threaded hole.

As shown in FIGS. 2 and 3, the surface of the sealing portion 33 that faces outside of the automobile is integrally coupled to the peripheral portion of the surface of the quarter window panel 21 that faces inside of the automobile. Since the window frame 31 and the quarter window panel 21 are molded integrally, the gap between the surface of the sealing portion 33 that faces outside of the automobile and the surface of the quarter window panel 21 that faces inside of the automobile is sealed.

In the state where the quarter window panel 21 is coupled to the sealing portion 33, the peripheral portion of the hypotenuse portion 40 projects outward from the edge of the surface of the quarter window panel 21 that faces outside of the automobile. The projecting part serves as a first fitting portion 40c. Also, a side edge of the quarter window panel 21 that corresponds to the hypotenuse portion 40 forms a second fitting portion 21a that projects outward from the edge of the hypotenuse portion 40. The quarter window panel 21 is transparent, and the window frame 31 is colored in black. Thus, when the quarter window 20 is viewed from the outside of the automobile, the sealing portion 33 is seen through the quarter window panel 21.

The above described quarter window 20 is fixed to the door frame 12 in the following manner. The screw (not shown) attached to the door frame 12 is threaded to the fixing portion 42 formed on the top portion 41, so that the top portion 41 is fixed to the door frame 12. Screws (not shown) are threaded to the door frame 12 through the fixing holes 35a of the fixing portions 35 provided to the division bar portion 32, so that the division bar portion 32 is fixed to the door frame 12. Further, as shown in FIG. 2, the first fitting portion 40c of the hypotenuse portion 40 and the second fitting portion 21a of the quarter window panel 21 are fitted to a fitting groove 12a formed in the door frame 12, and the gap between the first and second fitting portions 21a, 40c and the inner surfaces of the fitting groove 12a is sealed by the sealing member 50. Accordingly, the quarter window 20 is fixed to the door frame 12. Also, a glass run 15 is fitted to the division bar portion 32 and the door frame 12, and the window panel 13 is fitted to the glass run 15, so that the rear door 11 is completed.

In the rear door 11 described above, the surface of the quarter window panel 21 that faces outside of the automobile, the surface of the door frame 12 that faces outside of the automobile, and the surface of the glass run 15 that faces outside of the automobile are all flush. The division bar portion 32 forms part of the window frame 31 and is colored in black. The division bar portion 32 is coupled to the surface of the quarter window panel 21 that faces inside of the automobile.

The above described embodiment has the following advantages.

(1) Since the division bar portion 32 and the first fitting portion 40c have a high rigidity, the division bar portion 32 is prevented from elastically deformed so that the glass run 15 comes off the division bar portion 32, and the first fitting portion 40c is prevented from elastically deformed so that the first fitting portion 40c comes off the fitting groove 12a. Thus, the quarter window 20 is maintained to be installed in the door frame 12. Further, the fixing portion 35 is integrally formed with the window frame 31, and the window frame 31 is fixed to the door frame 12 by means of the fixing portion 35. This securely fixes the quarter window 20 to the door frame 12.

(2) The quarter window panel 21 is integrally coupled to the surface of the sealing portion 33 that faces outside of the automobile, and the gap between the sealing portion 33 and the quarter window panel 21 is sealed. Since the window frame 31 is fixed to the door frame 12, the quarter window panel 21 is attached to the door frame 12 without using a weather strip. If a weather strip is used, a step would be formed in the peripheral portion of the quarter window panel 21. However, according to the present embodiment, the quarter window panel 21 is attached to be flush with the door frame 12 and the glass run 15. As a result, wind roar caused by steps is reduced, and the aerodynamic drag is reduced. Also, the division bar 32 is integrally coupled to the surface of the quarter window panel 21 that faces inside of the automobile. Thus, the division bar portion 32 is not exposed to the outside of the automobile, and only the glass run 15 is exposed between the window panel 13 and the quarter window panel 21. This improves the appearance of the rear door 11.

(3) The fixing portions 35, 42 are integrally formed with the window frame 31. Therefore, compared to a case where separate brackets coupled to the division bar 32 to serve as the fixing portions 35, 42, the quarter window 20 is formed easily.

(4) The reinforcing ribs 32b, 40b are integrally formed with the division bar portion 32 and the hypotenuse portion 40, respectively. This increases the rigidity of the division bar 32 and the hypotenuse portion 40. As a result, the division bar portion 32 and the hypotenuse portion 40 are prevented from being deformed. Therefore, the glass run 15 is reliably prevented from coming off the division bar portion 32, and the hypotenuse portion 40 is reliably prevented from coming off the fitting groove 12a.

(5) The window frame 31 including the division bar portion 32 and the sealing portion 33, and the quarter window panel 21 are manufactured in a single manufacturing step by two-color molding. Therefore, the quarter window 20 is easily manufactured compared to the prior art quarter window, which is manufactured by placing a window panel and a division bar in a mold, and then injecting molten resin for molding a sealing member. Also, since the quarter window 20 is formed only of a synthetic resin material, the number of types of materials is reduced compared to the prior art quarter window, which is formed by using a metal material and a synthetic resin material. Thus, the manufacturing costs and the weight of the quarter window 20 are reduced.

The above described embodiment may be modified as follows.

The integral molding of the window frame 31 and the quarter window panel 21 may be performed by a method other than the two-color molding. For example, the window frame 31 and the quarter window panel 21 may be integrally molded by insert molding.

The materials of the quarter window panel 21 and the window frame 31 may be changed. For example, the quarter window panel 21 may be made of an ABS based material, and the window frame 31 may be made of a PET based material. Further, the quarter window panel 21 and the window frame 31 may be made of the same material.

As long as the window frame 31 has a required rigidity, the window frame 31 may be formed of a synthetic resin material containing no glass fiber.

The reinforcing ribs 32b of the division bar portion 32 and the reinforcing ribs 40b of the hypotenuse portion 40 may be omitted if the required rigidity of the division bar portion 32 is ensured without them.

The invention claimed is:

1. A quarter window attached to a door frame of a rear door of a vehicle, comprising:
    a quarter window panel made of a synthetic resin material and having an outer surface facing outside the vehicle and an inner surface facing inside the vehicle; and
    a window frame including a division bar and a sealing portion, an upper section of the division bar serving as a part of the sealing portion, and the division bar being configured such that a glass run can be fitted to the division bar, wherein the sealing portion is integrally coupled to the inner surface of the quarter window panel so as to extend along the periphery of the inner surface of the quarter window panel,
    wherein the quarter window panel and the window frame are integrally molded,
    wherein the window frame is made of a synthetic resin having a higher rigidity than the rigidity of the quarter window panel, and wherein a fixing portion for fixing the window frame to the door frame is integrally formed with the window frame,
    wherein the sealing portion includes a hypotenuse portion fitted to the door frame,
    wherein the hypotenuse portion has a first fitting member that projects in a direction toward the door frame and extends beyond an edge of the outer surface of the quarter window panel, the first fitting member being integrally coupled to the quarter window panel,
    wherein the quarter window panel includes a second fitting member that projects beyond the edge of the outer surface of the quarter window panel and is located closer to the door frame than the first fitting member, the second fitting member being a homogenous one piece integral part with the quarter window panel,
    wherein the first and second fitting members are fitted in a fitting groove formed in the door frame, and
    wherein a gap between the first and second fitting members and the fitting groove is sealed by a sealing member.

2. The quarter window according to claim 1, wherein the synthetic resin of the window frame is a fiberglass reinforced plastic.

3. The quarter window according to claim 1, wherein the hypotenuse portion has at least one reinforcing rib.

4. The quarter window according to claim 1, wherein the sealing portion is integrally coupled to the quarter window panel so that the sealing portion is covered by the quarter window panel when the quarter window is attached to the door frame.

* * * * *